(12) United States Patent
Plöchinger

(10) Patent No.: US 6,675,656 B1
(45) Date of Patent: Jan. 13, 2004

(54) PRESSURE OR FORCE SENSOR STRUCTURE AND METHOD FOR PRODUCING THE SAME

(76) Inventor: Heinz Plöchinger, Hinding 68, A-4785 Freinberg (AT)

( * ) Notice: Subject to any disclaimer, the term of this patent is extended or adjusted under 35 U.S.C. 154(b) by 0 days.

(21) Appl. No.: 09/647,958

(22) PCT Filed: Apr. 9, 1999

(86) PCT No.: PCT/EP99/02431

§ 371 (c)(1),
(2), (4) Date: Nov. 29, 2000

(87) PCT Pub. No.: WO00/10746

PCT Pub. Date: Mar. 2, 2000

(30) Foreign Application Priority Data

Apr. 9, 1998 (DE) ......................................... 198 16 152
Jun. 3, 1998 (DE) ......................................... 198 24 778

(51) Int. Cl.⁷ ................................................. G01L 9/12
(52) U.S. Cl. ........................................... 73/718; 73/724
(58) Field of Search ........................ 73/718, 715, 714, 73/716, 724, 736, 733, 723, 717

(56) References Cited

U.S. PATENT DOCUMENTS

| 4,542,436 | A | * | 9/1985 | Crusillo | ....................... | 73/718 |
| 5,445,031 | A | | 8/1995 | Benzel | ......................... | 73/724 |
| 5,792,957 | A | | 8/1998 | Luder et al. | ................. | 73/724 |
| 6,178,818 | B1 | * | 1/2001 | Plochinger | ................... | 73/304 |

FOREIGN PATENT DOCUMENTS

| DE | 2459612 | 12/1973 | ............. G01L/9/12 |
| DE | 4107345 | 3/1991 | ............. G01L/9/12 |
| DE | 4244450 | 12/1991 | ............. G01L/9/12 |
| EP | 195 985 | 1/1990 | ............. G01L/9/12 |
| EP | 461 459 | 6/1990 | ............. G01L/9/00 |
| GB | 2157444 | 10/1985 | ............. G01L/9/12 |
| WO | WO 90/12299 | 10/1990 | ............. G01L/9/12 |

* cited by examiner

Primary Examiner—Edward Lefkowitz
Assistant Examiner—Andre Allen
(74) Attorney, Agent, or Firm—Glenn Patent Group; Michael A. Glenn; Kirk D. Wong

(57) ABSTRACT

A force or pressure sensor structure has a membrane and a counter-structure, both being provided with electrodes for determining capacitors. There are at least two capacitors connected in series or in parallel for determining a desired pressure/capacitance dependence or a desired force/capacitance dependence. The counter-structure preferably is fixed and has a multiplicity of electrode areas in the shape of segments of a circle in order to assemble electrode areas obtained by optimization in a series or parallel connection. The interconnection of the individual elementary capacitors are preferably realized by a multilayer construction. The same membrane and an identical evaluation circuit can be used for any pressure/capacitance or force/capacitance dependence desired, with only the multilayer construction requiring modification for a different dependence. The electrode structures can preferably be defined by a few specifications, such as e.g., length, width, spacing or angle, radius, respectively.

18 Claims, 6 Drawing Sheets

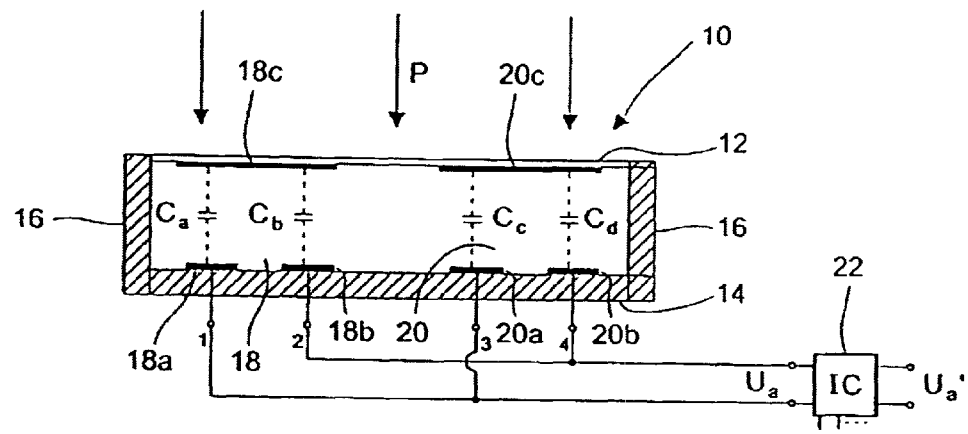
FIG.1
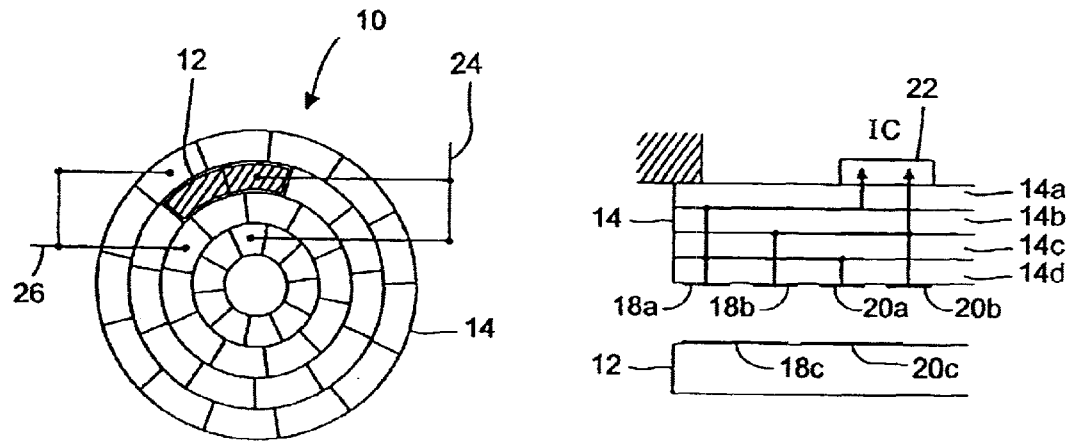
FIG.2
FIG.3

PRESSURE OR FORCE SENSOR STRUCTURE AND METHOD FOR PRODUCING THE SAME

The present invention relates in general to the field of sensor technique and in particular to capacitive pressure or force sensors for measuring physical quantities such as force, absolute pressure, differential pressure, deflection, spacing, and the like.

With capacititve sensors, such as described for example in European patent 0 461 459, the path of the characteristic curve, i.e. the pressure sensor output signal is determined as a function of the quantity to be measured, in essence by the mechanical properties thereof. This means that the deformation of a deflectable membrane above a basic structure or the displacement of a deflecting beam as a result of an external force directly determines the path of the characteristic curve if a sheet-like electrode on the movable element is located opposite a sheet-like electrode on the fixed element.

WO 90/12299 describes a capacitive pressure sensor in which the deflectable element, i.e. the membrane, has a single sheet-like electrode whereas the basic structure has already three electrodes provided thereon, one thereof delivering a constant output signal irrespective of the pressure applied, while the two other electrodes, together with the electrode attached to the membrane, each deliver two capacitive output signals which, with the same force applied, are different.

Disadvantageous in this arrangement is on the one hand the relatively complicated shape of the individual electrodes. The electrode configuration, moreover, cannot be described directly by geometric data, such as e.g. angles and associated radii. On the other hand, the electrode areas both of the membrane and of the supporting structure must be designed anew for different applications. Moreover, in the arrangement described it is necessary that all electrodes of the supporting structure as well as all electrodes of the membrane must be contacted separately in order to make sure that the indivdidual measuring capacitances are at different potentials, so that a fedback evaluation circuit can be used that is based on the switched-capacitor principle.

WO 93/11415 discloses a capacitive pressure measurement arrangement with high linearity. The pressure measurement arrangement comprises first and second measuring capacitances as well as two pressure-dependent capacitances. The electrode areas for defining the measuring capacitances and the pressure-dependent capacitances suitably designed for obtaining a linear output signal. The pressure sensor structure comprises furthermore two reference capacitances, with all capacitances being connected to each other by means of an external circuit arrangement such that the two measuring capacitances and the two reference capacitances are connected to each other in a bridge circuit, whereas the two additional pressure-dependent capacitances are each located in the feedback branches of a differential amplifier. The counter-structure has the same electrode area configuration as the membrane structure so as to render possible that all capacitances have different potentials applied thereto. Every electrode area can be realized by individual partial electrode areas or by a continuous electrode area.

WO 95/03534 discloses capacitive pressure sensors with high linearity. A chamber-side area of a membrane for pressure measurement is covered with a reference electrode and a measuring electrode. The counter-structure has a continuous electrode so that individual capacitances are formed between the electrode structures and the electrode covering the entire area, with said capacitances each having a terminal with the same potential.

U.S. Pat. No. 4,977,480 discloses a capacitance-type sensor, in which a capacitor with constant capacitance is connected in series with a capacitor with variable capacitance. The capacitance of the variable-capacitance capacitor varies in accordance with a pressure applied to the sensor. The variable-capacitance capacitor comprises a movable electrode on a membrane and a fixed electrode disposed opposite the movable electrode. The fixed counter-electrode furthermore is structured so as to form an additional counter-electrode for establishing a further variable capacitance that is connected in parallel to the other capacitance. A further variable-capacitance capacitor is connected in series with a constant-capacitance capacitor. All capacitances comprise an electrode on the membrane and another electrode on the counter-structure or, respectively, a capacitance remote from the measuring chamber in case of the fixed capacitances.

EP 0 195 985 discloses a capacitive pressure sensor comprising a common first electrode on a membrane as well as second and third electrodes, opposite the first electrode, on a counter-structure. Contact is established both with the electrodes on the counter-structure and with the electrode on the membrane, so as to establish two pressure-sensitive capacitors, with the change of capacitance thereof as a function of the pressure being the same for each.

DE-U-9013959 relates to a sensor for a capacitance manometer. The manometer comprises a base disc and a membrane connected to the same. On the inside of the base disc, there are provided at least two separate metallic layer sections which, together with electrically interconnected metallic layer sections on the membrane, constitute two series-connected capacitances the terminals of which are provided on the base disc. In case of this sensor it is no longer necessary to equip the membrane with electric contacts.

It is the object of the present invention to create a concept that provides for a simple pressure or force sensor structure for use in flexible manner, in which the path of the characteristic curve thereof can be brought into conformity with a desired path of the characteristic curve.

This object is met by a pressure or force sensor structure according to claim 1 as well as by a method for producing a pressure or force sensor structure according to claim 15.

A force or pressure sensor structure according to the invention comprises a membrane and a counter-structure, with the membrane and the counter-structure each having electrodes provided thereon for determining capacitors. For determining a desired pressure/capacitance dependence or force/capacitance dependence, respectively, at least two of the capacitors are connected in series or in parallel.

The present invention is based on the finding that, for obtaining independence of the path of the characteristic curve, there is provided a plurality of individual capacitors by corresponding electrode configuration in a pressure or force sensor structure, which with the same deflection deliver different capacitances. By connecting these capacitors in parallel or in series, it is possible then to obtain a combined capacitance curve as a function of the deflection of the membrane, which corresponds to a desired path. This means thus that the desired capacitance curve is obtained on the one hand by a geometric configuration of the capacitor electrodes in the capacitive sensor and on the other hand by interconnecting at least two capacitors having a corresponding configuration. Thus, there are at least two degrees of freedom present for obtaining a desired dependence.

Preferably, a large number of capacitors is determined by a large number of correspondingly shaped electrodes which then are suitably connected by means of an evaluation circuit with feedback feature whereby very complicated, and in particular also non-linear, desired pressure/capacitance dependences and force/capacitance dependences, respectively, can be simulated as well.

An advantage of the present invention furthermore consists in that it can be used for various applications, i.e. various dependences, without substantial modification. To this end, either the membrane or the counter-structure and preferably the counter-structure is provided with a multiplicity of circle segment-shaped electrode areas in the shape of segments of a circle (e.g. when considering a membrane or a counter-structure with the shape of a circle), which together with circle segment-shaped areas of the membrane define capacitors, with the possibility, by connecting various capacitors in series or in parallel, of so to speak "putting together" or "assembling" arbitrary desired electrode areas that were calculated in a preceding numerical simulation. In particular when a multilayer construction is used for the counter-structure, this provides an extremely flexible concept since the metallization structuring both of the membrane and of the counter-tructure as well as the evaluation circuit employed are the same for any application, i.e. for any pressure/capacitance dependence or force/capacitance dependence, respectively, whereas the parallel connection of individual capacitors, i.e. the "assembling" of the calculated electrode areas, is effected only by multilayer-structuring of the counter-structure or also of the membrane. The resolution of the area, i.e. the shape of the areas that can be "assembled" is determined by the number of the individual electrode areas and opposed electrode areas of the other element of the pressure or force sensor structure. If a sufficient number of small electrode areas is provided, corresponding, numerically calculated electrode areas can be assembled in virtually arbitrary manner by connecting corresponding capacitor elements in parallel.

For reducing the thus increasing contacting expenditure, a concept is used according to the invention in which, differently from the prior art in which the electrodes both of the membrane and of the counter-structure have to be contacted so far, only either the membrane or the counter-structure is contacted. This contributes in providing the effect that the membrane and the counter-structure have the same metallization for any dependence desired, since the so to speak macroscopic design of the electrodes is effected just by interconnecting individual elementary capacitors, preferably using multilayer structuring on one element only.

Furthermore, one should not underestimate the fact that, for all dependences desired, it is possible to employ just one single evaluation circuit in the form of an electronic integrated circuit, that is the same for all desired dependences and thus can be produced mostly in large numbers of pieces and thus in inexpensive manner. This is particularly significant for capacitive pressure or force sensor structures since these are mostly employed in large numbers of pieces at many locations of a system. The multilayer structuring, in particular if it is applied to the fixed element of the pressure or force sensor structure or even constitutes said fixed element, can be provided using very inexpensive materials and, despite the different design for each dependence, can be established in very inexpensive manner in due to the high standard of sophistication in multilayer technology.

Preferred developments of the present invention will be elucidated in detail hereinafter with reference to the attached drawings in which FIG. 1 shows a basic diagram for illustrating the principle if contact is established with one element only;

FIG. 2 shows a schematic representation either of the counter-structure or of the membrane of the pressure or force sensor structure according to the invention;

FIG. 3 shows a cross-section of the structure illustrated in FIG. 2;

Figure 4:
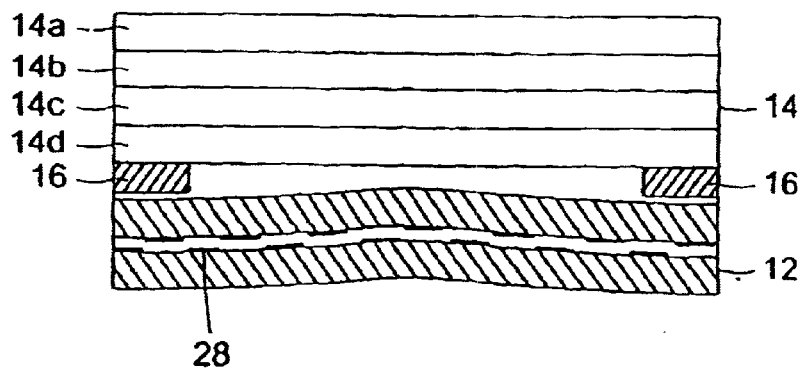
FIG. 4 shows a cross-section of the pressure or force sensor structure according to the invention, making use of an electric shielding grid.

FIG. 1 illustrates a schematic view of a pressure or force sensor structure 10 comprising a membrane 12 and a counter-structure 14. It is to be pointed out that, for reasons of representation, FIG. 1 just shows a case in which the counter-structure 14 is fixed whereas the membrane is indicated to be movable, i.e. deformable. Membrane 12, with respect to supporting structure 14, is held by means of a preferably rigid holding means 16 so that, upon application of a pressure P, bending of the membrane 12 towards the counter-structure 14 takes place. It is obvious that such bending will be considerably stronger in the middle than at the periphery.

For capacitively detecting said bending, FIG. 1 shows two capacitors 18, 20. Capacitor 18 has a terminal 1 as well as first and second electrode areas 18a and 18b applied on counter-structure 14, as well as a third electrode area 18c arranged on membrane 12 in such a manner with respect to first and second electrode areas 18a, 18b that a first capacitance $C_a$ is present between the first electrode area 18a and the third electrode area, whereas another capacitance $C_b$ is present between the second electrode area 18b and the third electrode area 18c. The capacitance of capacitor 18, which can be measured at terminals 1 and 2, thus consists of a series connection between the individual capacitances $C_a$ and $C_b$. It is apparent to experts that a stray capacitance may be present furthermore between first and second electrode areas, that is substantially unaffected by the deflection of membrane 12. This stray capacitance should be small so as to not cover a change in capacitance due to deflection of the membrane. However, this condition is mostly fulfilled as the distance between membrane and counter-structure usually is very small.

The second capacitor 20 has a construction analogous to the first capacitor 18 and also comprises first and second electrode areas 20a, 20b as well as a third electrode area 20b. The capacitance of capacitor 20 that can be measured at terminals 3 and 4 thus is also composed of a series connection of a first capacitance $C_c$ between the first electrode area 20a and the third electrode area 20c applied to membrane 12, and of a capacitance $C_d$ formed between the second electrode area 20b on counter-structure 14 and the third electrode area 20c on membrane 12.

The capacitor concept illustrated in FIG. 1 has the decisive advantage that only the counter-structure 14 has to be provided with contacts, whereas the active element, i.e. the membrane 12 that is deflected upon application of pressure, does not require any contacts. This provides for considerable simplification. In addition thereto, it is possible by corresponding design of the membrane, to utilize the same membrane for any dependences, as will still be described hereinafter. Contacting of the first and second electrode areas 18a, 18b and 20a, 20b can be effected on the, with respect to FIG. 1, lower side of the counter-structure, for example, by means of conductive tracks or alternatively by means of a multilayer structure, as will still be described later on as well.

For obtaining a desired capacitance dependence of pressure or force sensor structure 10, the two capacitors 18, 20, which may be placed at any location with respect to membrane 12, depending on the desired application, may be connected either in series or in parallel in order to obtain a sensor output signal $U_a$ with the desired dependence. Just as a preferable possibility, the direct sensor output signal $U_a$ can be processed by an integrated circuit IC 22, in order to obtain a processed output signal $U_a'$. It is obvious to experts that integrated circuits 22 usually have more than two inputs for a single voltage, whereby the output signals of several interconnected capacitors may be combined in arbitrary manner. Moreover, it is possible, and preferably also implemented, that more than two capacitors are connected to each other in parallel or in series, or both in series and in parallel, so as to obtain a desired dependence and sensitivity, respectively, of the pressure or force sensor structure 10 that is matched to the particular application. In addition thereto, the individual electrode areas 18a–18c and 20a–20c are preferably suitably structured on the membrane and the supporting structure, respectively, in order to obtain, on the basis of the electrode configuration alone, a capacitance curve which then, together with the interconnection of the capacitors, leads to the desired pressure/capacitance or force/ capacitance curve, respectively, i.e. a specific output signal $U_a$ as a function of the pressure P applied.

In general, a parallel connection of capacitors rather is preferred over a series connection as in case of a series connection of capacitors, the smaller capacitance always is of dominant influence, which possibly may lead to sensitivity losses. In addition thereto, the parallel connection of capacitors permits the simple "assembly" of "macroscopic" electrode areas from "microscopic" electrode areas.

FIG. 2 shows a plan view of a preferred embodiment of the pressure or force sensor structure 10 according to the invention, with particular attention having been attached to the metallization of the supporting structure 14. In contrast thereto, the membrane 12 is just indicated by a third electrode area 18c and 20c, respectively. It can be seen from FIG. 2 that the supporting structure 14 has a multiplicity of circle segment-shaped electrode areas that can be connected by means of a corresponding electrode in the membrane 12, in order to establish capacitors. Schematic connections 24 and 26 illustrate a first interconnection of two capacitors in order to create a first group (24) and a second group (26), respectively. It is to be pointed out that the individual elementary configuration of the electrode areas, which in FIG. 2 is the shape of a segment of a circle, may also adopt an arbitrary other shape. However, for membranes of circular shape, a design with a circle sector-shaped configuration is expedient.

In addition thereto, it is not necessary either that two electrode areas arranged on one and the same circle ring constitute a capacitor together with a correspondingly shaped electrode area on the membrane. It is also possible that capacitors are established by electrode areas in different circle rings. Moreover, it is not required either that the interconnections of the capacitors be effected in just one quadrant of the circle. The conductor structures 24 and 28 may be of arbitrary design, and in this respect it would also be conceivable in principle that a capacitor which, as shown in FIG. 1, consists of three electrode areas of which two are provided on one element and the third one is provided on another element of the sensor structure 10, is present in both groups. In addition thereto, it is possible to form arbitrary groups, i.e. also more than two groups of interconnected capacitors, depending on the desired dependence or which evaluation circuit 22 is available, respectively. Furthermore, the number of rings with electrode areas can be chosen as desired, with an arbitrary exact composition of the areas being obtained by arbitrary small dimensioning of the elementary electrode areas.

The individual electrode areas of course have to be separated from each other by non conducting webs. This will constitute a lower limit for the area of the individual electrode areas since, with increasing ratio of non-conducting webs to the metallization area, the effective electrode area decreases and the sensitivity of the sensor structure thus is reduced as well. For high sensitivity of the sensor structure, it is necessary to interconnect if possible all electrode areas in some way or other; however, it is just as well possible, in corresponding dependence on the desired pressure/capacitance dependence or force/capacitance dependence, respectively, to utilize only some of the basically available capacitors and to leave the others unused.

FIG. 3 shows a cross-sectional view of the pressure or force sensor structure of FIG. 2. FIG. 3 in particular reveals the construction of the counter-structure as a multilayer construction. The counter-structure consists, for example, of four layers 14a to 14d, with the layer 14d having the first and second electrode areas 18a, 18b and 20a, 20b provided thereon, with corresponding third electrode areas 18c and 20c being located opposite the same. FIG. 3 shows the situation in which the two capacitors 18 and 20 are connected in parallel. This parallel connection is obtained by means of conductive tracks provided on the multilayer structures and interconnected by through-holes in the multilayer structures from one layer to the next layer. By using multilayer structuring for the fixed counter-structure 14, it is possible to make use of one single evaluation circuit 22 only for all applications desired, since the conductive tracks on the uppermost layer 14a, on which integrated circuit 22 can be directly mounted, can be designed in such a manner that corresponding elements are connected to the specific inputs of the integrated circuit 22 that are provided for this purpose. It is obvious to experts that, in accordance with the deflections of the membrane that are expected or necessary, the membrane itself may have the multilayer structure as well, whereas the counter-structure is fixed and no contact is established with the same. However, this will rather be the less frequent application.

FIG. 4 shows an additional example of the pressure or force sensor structure according to the invention, with the membrane 12 being of multilayer construction, but not just for interconnection of several elements, but rather for accommodating a shielding grid 28 within a "sandwich" structure; this "sandwich" structure may be present both in the counter-structure 14 and in the membrane 12, as shown in FIG. 4. This shielding grid or a continuous shielding coating, respectively, serves for providing electromagnetic decoupling from external fields or effects.

Figure 5:
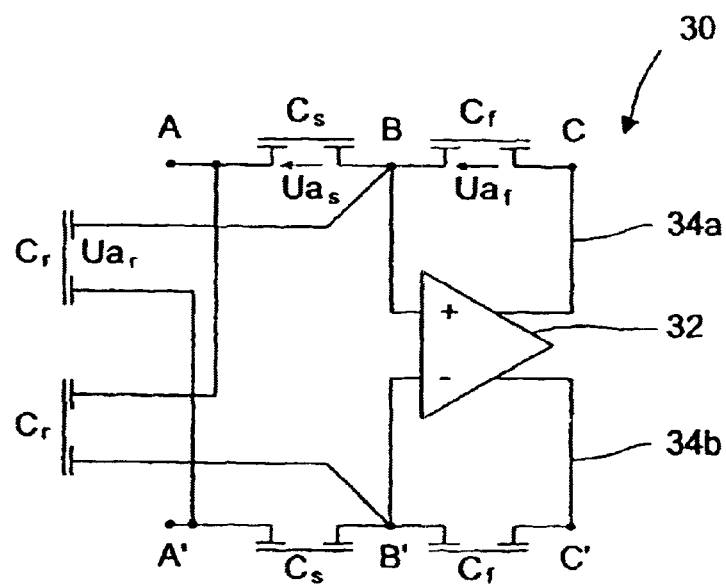
FIG. 5 shows a simplified circuit diagram of an evaluation circuit that can be used advantageously with the pressure or force sensor structure of the present invention.

FIG. 5 shows an evaluation circuit 30 which preferably can be used with the pressure or force sensor structure 10 according to the present invention. Evaluation circuit 30 comprises an operational amplifier 32 having two feedback branches 34a, 34b, with both feedback branches having one feedback capacitance $C_f$ (f=feedback) each. Connected to operational amplifier 32, via nodes B and B', are furthermore reference capacitances $C_r$ and signal capacitances $C_s$. It is to be pointed out that $C_r$ and $C_s$ as well as $C_f$ may be capacitances of interconnected capacitors, as it is also indicated symbolically by arrows $U_{af}$, $U_{as}$ and $U_{ar}$. Thus, it would be possible for example to use the interconnection 24 for generating a capacitance $C_f$, whereas interconnection 26 is used for generating a signal capacitance $C_s$ and an additional interconnection is used for generating a reference capacitance $C_r$.

The circuit principle underlying FIG. 5 is known and thus need not be elucidated in more detail. However, it is to be pointed out that at inputs A and A' of circuit 30, there is applied a dc voltage that is alternatingly reversed in its polarity. The output signal having the desired dependence, i.e. $U_a'$ (FIG. 1), is tapped at nodes C and C'. For reasons of clarity, additional necessary switches were omitted from FIG. 5, since FIG. 5 is based on the "switched-capacitor" principle which is known in technology and is based on the principle that capacitances connected in the configuration shown behave analogously to resistors. The double connection of operational amplifier 32 has the advantage that, utilizing the differential path principle, a reduced dependence on the operating voltage is present. Output signal $U_a'$ at nodes C and C' is proportional to the quotient $(C_s-C_r/C_f)$. $C_s$, with $C_f$ and $C_r$, as mentioned hereinbefore, being corresponding groups of capacitors that may be established by parallel and/or series connection of individual capacitors, with an individual capacitor consisting at least of a first and a second electrode area and in addition thereto of a third electrode area.

The realization examples of the pressure or force sensor structure according to the invention, as illustrated hereinafter, as well as the measurement results or simulation results obtained, respectively, are based on a pressure or force sensor structure as shown in FIGS. 1 to 4, with this structure being connected to the circuit shown in FIG. 5.

Figure 6:
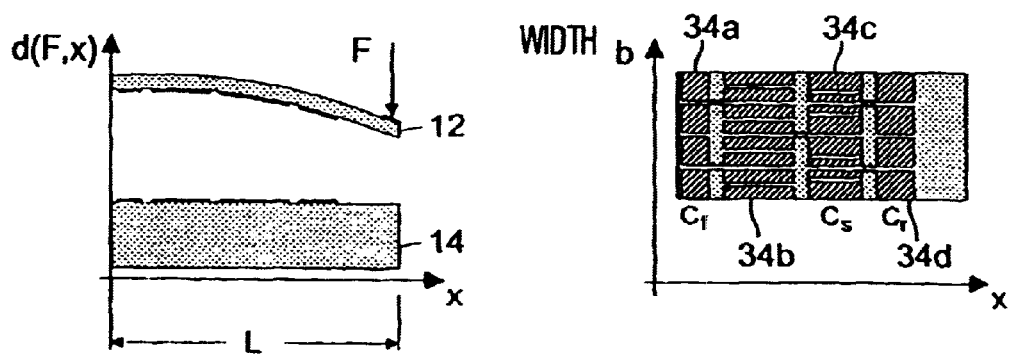
FIG. 6 shows an example of a pressure or force sensor structure according to the invention on a deflecting beam.

FIG. 6 shows the concept of the invention by way of a deflecting beam that is analogous to membrane 12 and is subjected to a load at its end by a force F and has a sensor base body 14 located opposite thereto, with the metallizations being indicated schematically only. An electrode distribution suited for adaptation to various shapes of characteristic curves is shown in FIG. 6 in exemplary manner. This electrode distribution could be applied to the beam bottom side. The area available is subdivided into a number of transverse strips 34a to 34d, with the deflection, as indicated by the line of deflection, being strongest at strip 34a whereas it becomes lesser towards strip 34d. The transverse strips may be subdivided into an arbitrary number of longitudinal strips, with the three measurement capacitances $C_s$, $C_f$ and $C_r$, in the embodiment shown in FIG. 6, being each composed of four electrode strips of different lengths and width. The length and width of the individual strips as well as the distribution to the three measurement capacitances determine the output signal of the sensor, with the desired pressure/capacitance dependence or force/capacitance dependence, respectively, being adapted to be adjusted. The electrode area pattern underlying FIG. 6, contrary to FIG. 2, will not be an array of area segments of a circle, but an array of squares that are connected in parallel via the counter-structure 14 or the deflecting beam 12 in order to simulate the areas shown to the right in FIG. 6.

Figure 7A:
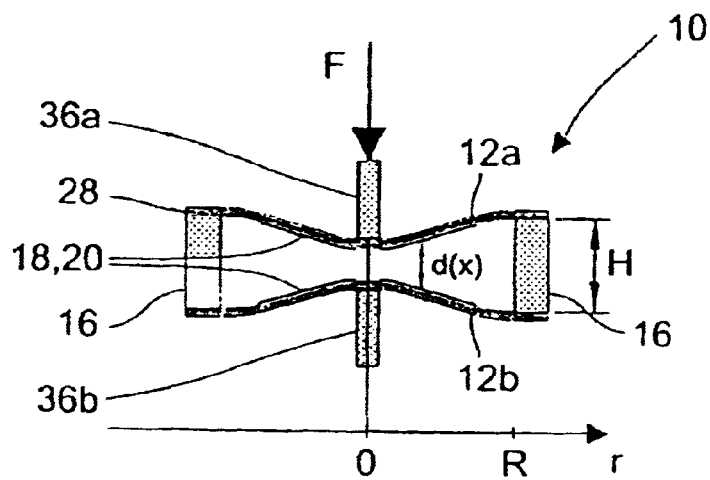
FIG. 7a shows a pressure or force sensor structure having two circular membranes for a measurement on two sides.

FIG. 7a shows a further example of a pressure or force sensor structure 10 according to the present invention, which has a double membrane 12a and 12b. Both membranes are provided in addition with a tappet 36a, 36b for the transmission of force. Moreover, both membranes are of "sandwich"-like structure including a shielding grid 28 and have a metallization for forming capacitors 18, 20 both on the upper membrane 12a and on the lower membrane 12b. The individual electrode area distribution is not shown in FIG. 7 for reasons of clarity. In the double-membrane example shown in FIG. 7a, the series connection of two elementary capacitances described in connection with FIG. 1 is particularly advantageous, since contacting has to be carried out on one membrane 12a or 12b only. The interconnection could be realized in this case too on one membrane by multilayer structuring. However, more desirable is in this case an interconnection by means of conductive tracks if the membranes are supposed to have very high sensitivity and therefore must not be very thick.

Figure 7B:
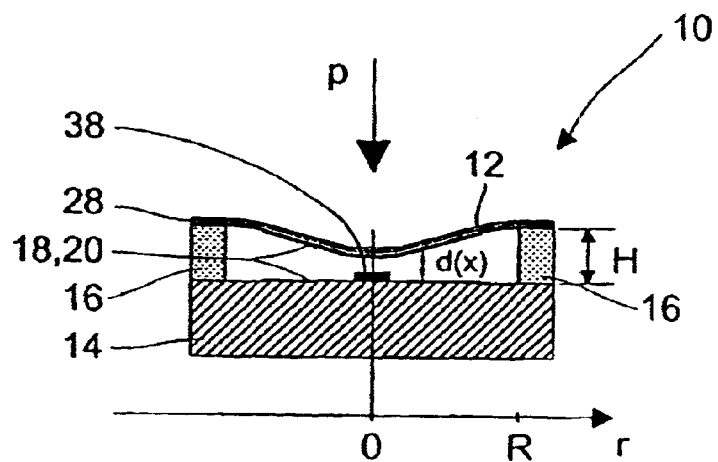
FIG. 7b shows a pressure or force sensor structure according to the invention using only one membrane and a fixed counter-structure.

FIG. 7b, in contrast to FIG. 7a, does not show a force sensor but a pressure sensor 10, which also has a membrane 12 with shielding grid 28 and metallization, opposite of which is arranged a metallization of counter-structure 14 in order to again establish capacitors 18, 20. FIG. 7b shows only schematically a supporting structure 38 which may also be utilized with all other sensors according to the invention for supporting the membrane at the edge of its permissible range of deflection, in order to avoid destruction thereof in case of overload.

FIG. 7b, for reasons of clarity, does not show the structuring of the metallizations of membrane and counter-structure, either.

Figure 8A:
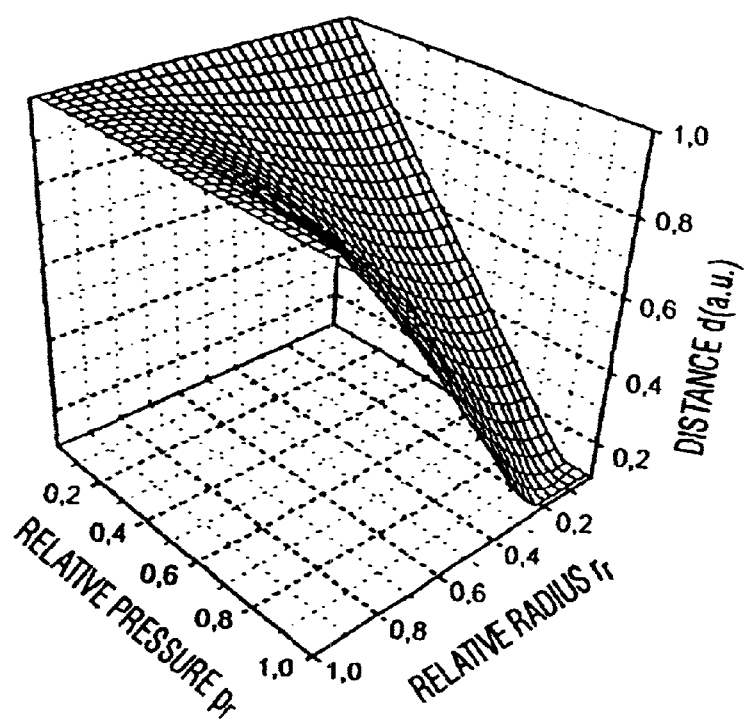
FIG. 8a shows a numerical simulation of the distance of the membrane from the counter-structure for the structure illustrated in FIG. 7b.

FIG. 8a illustrates the result of a simulation of the deflection of the membrane of FIG. 7b, with the distance of an area element of the membrane 12 from the counter-structure 14 varying in accordance with the location of the area element on the membrane 12 and the applied pressure.

Figure 8B:
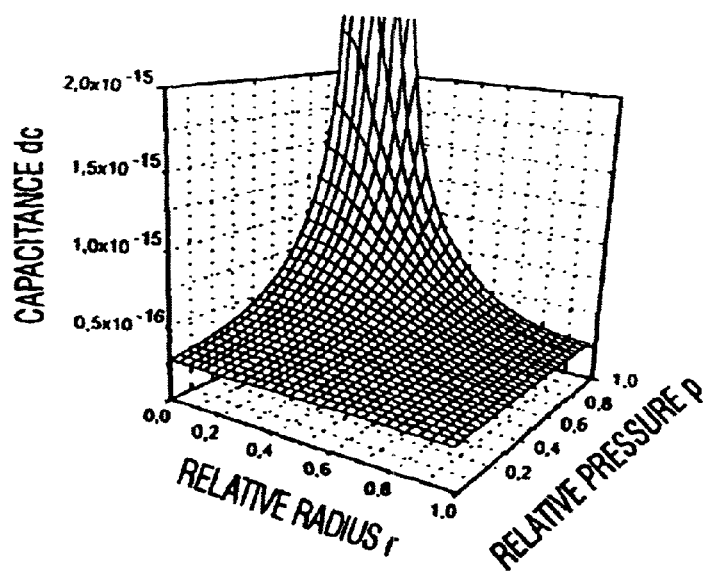
FIG. 8b shows a numerical simulation of the capacitance of an area element as a function of the applied pressure and the distance from the center of the structure of FIG. 7b.

FIG. 8b illustrates the numerical simulation of the capacitance of each area element as a function of the position (relative radius) and the pressure applied. Each area element simulated in FIG. 8b could correspond to a third electrode area and to first and second electrode areas, respectively, i.e. to an individual capacitor.

FIG. 8b thus shows the capacitance contribution of each individual capacitor, and for determining a capacitance curve it is possible to connect specific individual capacitors in parallel and/or in series, which can be calculated for example, by numerical optimization. By a corresponding geometrical distribution of the electrode areas, it is thus possible to adjust, within wide limits, a desired output characteristic, preferably using an evaluation circuit with feedback branch.

A field of application for simulating a non-linear transmission function will be elucidated in the following with reference to FIGS. 9a, 9b and 10. The present invention of course is also suited to realize the special case of a linear characteristic.

Figure 9A:
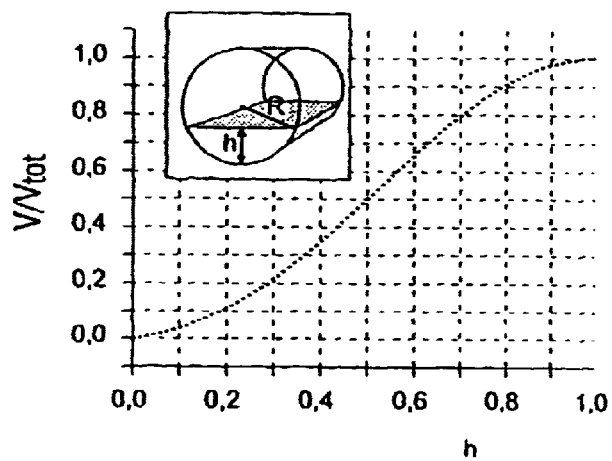
FIG. 9a shows the filling volume of a lying cylinder as a function of the filling level for elucidating the simulation of a non-linear characteristic curve.

FIG. 9a shows the filling level curve of a lying cylinder. In particular, FIG. 9a shows the share of the filling volume in the overall volume as a function of the filling height h of the cylinder. To be able to make use of a pressure or force sensor structure simulating the filling level curve shown in FIG. 9a, said structure must have a corresponding non-linear dependence of the output signal on the pressure prevailing in the container. By way of a suitable optimization method, the output signal of the switched-capacitor circuit according to FIG. 5, which has a transmission function proportional to the quotient $(C_s-C_r)/C_f$, must be matched or fitted to the filling level curve. The graphical representation at the top of FIG. 9 represents the transmission function and the fitted function, whereas the lower graphical representation, in highly exaggerated manner, indicates the relative deviation in percent between the filling level curve and the optimized sensor output curve as a function of the relative pressure on the sensor.

Figure 9B:
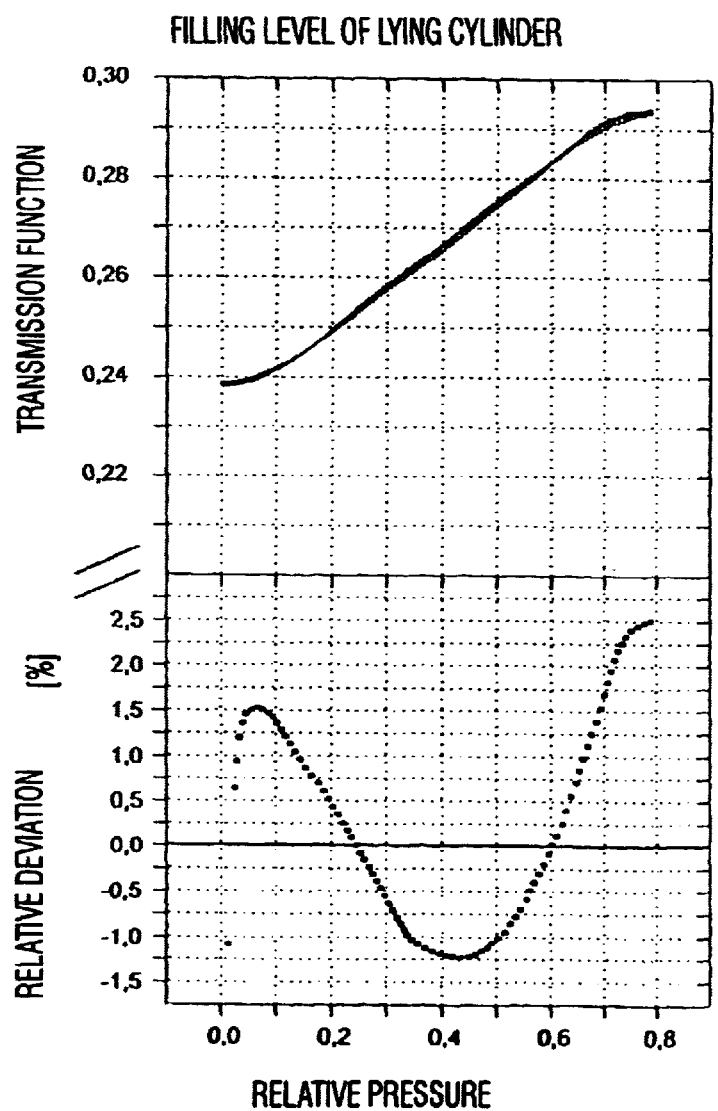
FIG. 9b shows a comparison between the realized dependence and the desired dependence of a pressure or force sensor structure according to the invention.
Figure 10:
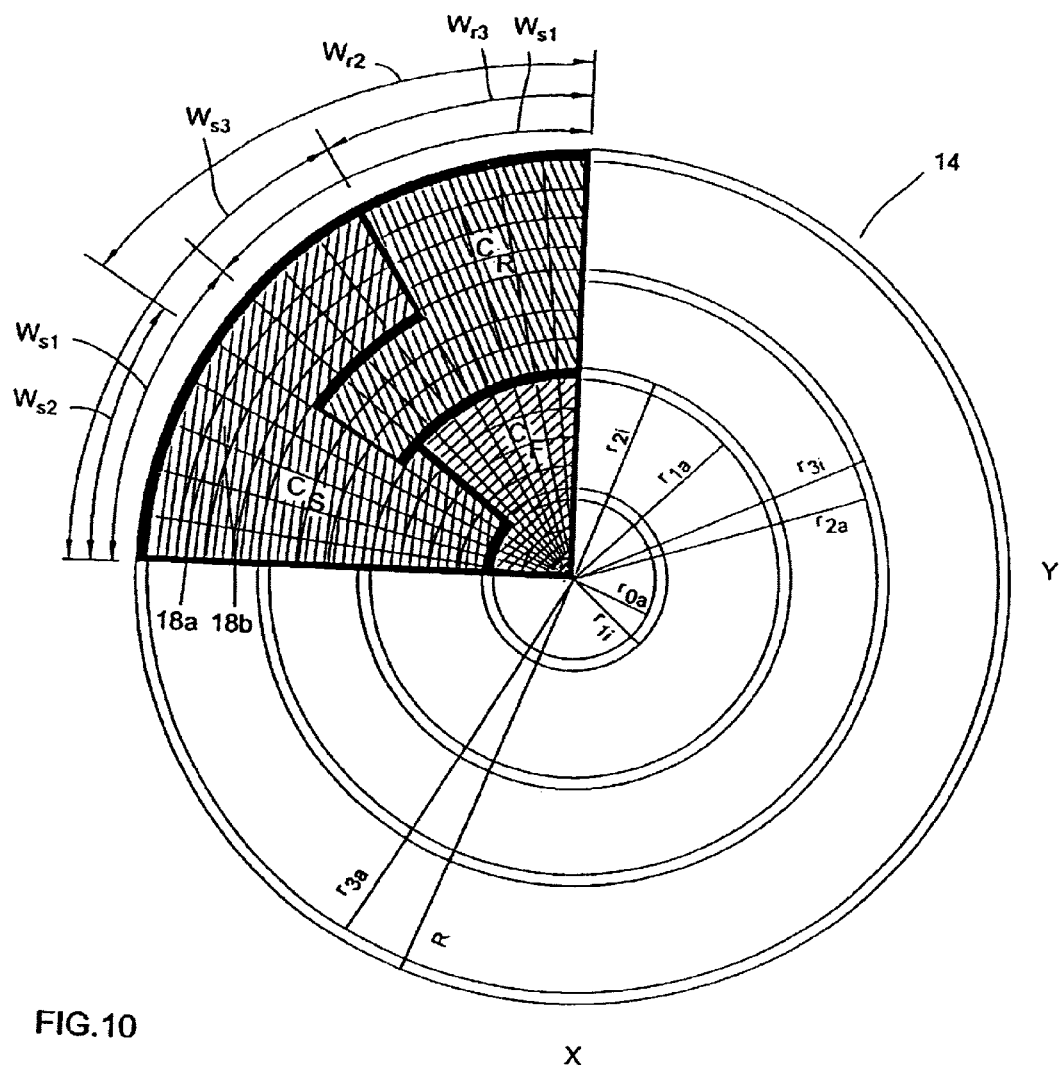
FIG. 10 shows a schematic plan view of a counter-structure of a pressure or force sensor structure according to the invention, which realizes the transmission function illustrated in FIG. 9b.

FIG. 10 shows an optimized pressure or force sensor structure used for realizing the results of FIG. 9b. The transmission function shown in the upper part of FIG. 9b was obtained by means of a circular membrane and a circular counter-structure 14, with FIG. 10, for reasons of clarity, just showing the counter-structure in schematic manner. FIG. 10 depicts the electrode areas of capacitors $C_S$, $C_R$ and $C_F$ for the circuit shown in FIG. 5 in one quadrant. The entire sensor structure results by mirroring the quadrant with inscription on the X axis and mirroring the resulting half circle on the Y axis. FIG. 10 indicates furthermore an elementary capacitor by way of the first and second electrode areas 18a and 18b, opposite of which is located a corresponding third electrode area of the membrane (not shown) in order to form this elementary capacitor.

The calculated areas of capacitances $C_S$, $C_R$ and $C_F$ are composed or assembled by parallel connection of corresponding elementary capacitors 18 by means of a multilayer structure 14a to 14d depicted in FIG. 3. It is to be pointed out that the elementary electrode area distribution shown in FIG. 10 is relatively fine and permits very fine matching to a desired characteristics. For the relatively coarse electrode structure shown in FIG. 10, a coarser electrode area distribution or partitioning would be sufficient as well. The dimensions shown in FIG. 10 result as follows, with w indicating a segment of a circle, whereas r stands for the relative radius, i.e. a radius related to the total radius R of the membrane. In detail, the following values were obtained:

TABLE

| Web width: 0.20 mm | | | |
|---|---|---|---|
| $r_{0a}$ = 2.30 mm | $r_{1a}$ = 5.00 mm | $r_{2a}$ = 8.00 mm | $r_{3a}$ = 9.00 mm |
| $r_{0i}$ = 0.73 mm | $r_{1i}$ = 2.66 mm | $r_{3i}$ = 5.36 mm | $r_{3i}$ = 8.36 mm |
| $w_{s0}$ = 0.0° | $w_{s1}$ = 39.0° | $w_{s2}$ = 32.0° | $w_{s3}$ = 60.0° |
| $w_{f0}$ = 90.0° | $w_{f1}$ = 51.0° | $w_{f2}$ = 0.0° | $w_{f3}$ = 0.0° |
| $w_{r0}$ = 0.0° | $w_{r1}$ = 0.0° | $w_{r2}$ = 58.0° | $w_{r3}$ = 30.0° |

It may thus be summarized that the pressure or force sensor structures according to the present invention display a number of advantages. With specific embodiments having a membrane and a fixed counter-structure, the "active" electrodes no longer need to be electrically connected. Moreover, a general calculation method permits a characteristics transformation of the sensor structure within wide limits, for combining correspondingly shaped isolated electrode areas, with the afore-described evaluation circuit making use of preferably three capacitor groups. By construction of the capacitive sensors in the "sandwich" system, the corresponding series or parallel connection of the individual capacitors of a group and also the group combination can be carried out in flexible and convenient manner. A shielding grid or also a continuous shielding coating on or within the "sandwich" structures is possible both in the counter-structure and in the membrane in order to mitigate external effects. Especially in conjunction with a "switched-capacitor" evaluation circuit, which preferably is provided on the counter-structure directly, the "wiring" possibility of the layer structure is especially advantageous. In addition thereto the structure according to the invention also permits the use of glass membranes on which only the third electrode areas have to be applied by vapor deposition and which do not require any wiring of the membrane whatsoever. The electrode structures preferably can be defined by few specifications, such as e.g. length, width, spacing or angle, radius, respectively.

What is claimed is:

1. A pressure or force sensor structure comprising:
    a deformable membrane;
    a counter-structure;
    a holder placed between the membrane and the counter-structure, the holder connecting the membrane and the counter-structure such that there is a gap between the membrane and the counter-structure, the gap being varied by a bending of the membrane towards the counter-structure when a pressure or a force is applied to the membrane;
    wherein the membrane includes an array of elementary electrode areas thereon for establishing elementary capacitors for capacitively detecting the bending of the membrane, an elementary capacitor being formed by elementary electrode areas on the membrane and an electrode on the counter-structure, the elementary electrode areas on the membrane being separated from each other by non-conducting webs; and
    an interconnection structure having wires, the wires connecting in series or in parallel the elementary capacitors for determining a desired pressure/capacitance dependence or force/capacitance dependence, respectively, from a multiplicity of pressure/capacitance dependences or force/capacitance dependences, respectively.

2. The pressure or force sensor structure of claim 1, wherein an elementary capacitor is formed by two elementary electrode areas on the membrane and by a third elementary electrode area on the counter-structure, with the capacitance of the elementary capacitor being formed by a series connection of two capacitances between the first and the third as well as the second and the third elementary electrode areas.

3. The pressure or force sensor structure of claim 2, wherein the third elementary electrode area overlaps the first and second elementary electrode areas.

4. The pressure or force sensor structure of claim 2, wherein a multiplicity of capacitors is provided such that the entire active portion of the membrane and of the counter-structure is covered by many first and second and, respectively, third elementary electrode areas.

5. The pressure or force sensor structure of claim 1, wherein the first and second elementary electrode areas have the shape of segments of a circle.

6. The pressure or force sensor structure (10) of any of the preceding claims, wherein both the membrane (12) and the counter-structure (14) are deflectable.

7. The pressure or force sensor structure (10) of any of claims 1 to 5, wherein the counter-structure (14) is fixed and only the membrane (12) is deflectable.

8. The pressure or force sensor structure of claim 7, wherein the interconnection structure is included in the counter-structure.

9. The pressure or force sensor structure of claim 8, wherein the interconnection structure comprises a multilayer construction the wires including conductive tracks associated to individual layers and via holes for through-contacting of the individual layers.

10. The pressure or force sensor structure of claim 1, wherein the membrane and/or the counter-structure is/are of sandwich-like construction and has/have a shielding means for shielding external effects.

11. The pressure or force sensor structure (10) of any of claims 4 to 10, wherein an evaluation circuit (22) is disposed on the side of the counter-structure (14) directed away from the membrane (12).

12. The pressure or force sensor structure of claim 4, wherein the elementary capacitors include an elementary capacitor group for signal detection, an elementary capacitor group for feedback and an elementary capacitor group for reference.

13. The pressure or force sensor structure of claim 12, wherein the reference elementary capacitor group is arranged in a region permitting a lesser extent of deflection, and wherein the feedback elementary capacitor group is arranged in a region permitting a high extent of deflection.

14. The pressure or force sensor structure (10) of any of the preceding claims, wherein the membrane (14) is a glass membrane.

15. A method for producing a pressure or force sensor structure comprising a deformable membrane, a counter-structure, and a holder placed between the membrane and the counter-structure, the holder connecting the membrane and the counter-structure such that there is a gap between the membrane and the counter-structure, the gap being varied by a bending of the membrane towards the counter-structure when a pressure or a force is applied to the [sensor structure] membrane, the membrane and the counter-structure having an array of elementary electrode areas establishing elementary capacitors for capacitively detecting the bending of the membrane, an elementary capacitor being formed by elementary electrode areas on the membrane and the counter-structure, the elementary electrode areas on the membrane and/or the counter-structure being separated from each other by non-conducting webs, the method comprising:

selecting a pressure/capacitance dependence or a force/capacitance dependence, respectively, from a multiplicity of pressure/capacitance dependences or force/capacitance dependences, respectively;

optimizing a transfer function of a pressure or force sensor structure to be realized, in order to obtain a simulated pressure/capacitance dependence or force/capacitance dependence, respectively, which at least approximates the selected dependence;

forming an interconnection structure having wires, the wires connecting in series and/or in parallel the elementary capacitors, whereby a transfer function, obtained in the optimizing step, is generated.

16. The pressure or force sensor structure of claim 1, wherein an elementary capacitor is formed by two elementary electrode areas on the counter-structure and by a third elementary electrode area on the membrane, with the capacitance of the elementary capacitor being formed by a series connection of two capacitances between the first and the third as well as the second and the third elementary electrode areas, and wherein the interconnection structure is arranged such that it contacts the counter-structure and does not contact the membrane.

17. A pressure or force sensor structure comprising:

a deformable membrane;

a counter-structure;

a holder placed between the membrane and the counter-structure, the holder connecting the membrane and the counter-structure such that there is a gap between the membrane and the counter-structure, the gap being varied by a bending of the membrane towards the counter-structure when a pressure or a force is applied to the membrane;

wherein the counter-structure includes an array of elementary electrode areas thereon for establishing elementary capacitors for capacitively detecting the bending of the membrane, an elementary capacitor being formed by an electrode on the membrane and elementary electrode areas on the counter-structure, the elementary electrode areas on the counter-structure being separated from each other by non-conducting webs; and an interconnection structure having wires, the wires connecting in series or in parallel the elementary capacitors for determining a desired pressure/capacitance dependence or force/capacitance dependence, respectively, from a multiplicity of pressure/capacitance dependences or force/capacitance dependences, respectively.

18. A pressure or force sensor structure comprising:

a deformable membrane;

a counter-structure;

a holder placed between the membrane and the counter-structure, the holder connecting the membrane and the counter-structure such that there is a gap between the membrane and the counter-structure, the gap being varied by a bending of the membrane towards the counter-structure when a pressure or a force is applied to the membrane;

wherein the membrane and the counter-structure include an array of elementary electrode areas thereon for establishing elementary capacitors for capacitively detecting the bending of the membrane, an elementary capacitor being formed by elementary electrode areas on the membrane and the counter-structure, the elementary electrode areas on the membrane and the counter-structure being separated from each other by non-conducting webs; and an interconnection structure having wires, the wires connecting in series or in parallel the elementary capacitors for determining a desired pressure/capacitance dependence or force/capacitance dependence, respectively, from a multiplicity of pressure/capacitance dependences or force/capacitance dependences, respectively.

* * * * *